United States Patent
Luo et al.

(10) Patent No.: US 7,082,342 B2
(45) Date of Patent: Jul. 25, 2006

(54) SYSTEM AND METHOD FOR MANAGEMENT OF MOLD DESIGN AND PRODUCTION

(75) Inventors: Sheng Chi Luo, Tu-Chen (TW); Yingchun Huang, Shenzhen (CN); ZiYong Wu, Shenzhen (CN); Jun Yan, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/899,524

(22) Filed: Jul. 26, 2004

(65) Prior Publication Data

US 2005/0021171 A1    Jan. 27, 2005

(30) Foreign Application Priority Data

Jul. 25, 2003    (TW)    .............................. 92120346 A

(51) Int. Cl.
G06F 19/00    (2006.01)
(52) U.S. Cl. .................... 700/97; 700/100; 700/197
(58) Field of Classification Search ................ 700/97, 700/98, 100, 108, 109, 117, 118, 159, 169, 700/174, 182, 197, 201, 204
See application file for complete search history.

(56) References Cited

U.S. PATENT DOCUMENTS

| 5,822,206 | A  | * | 10/1998 | Sebastian et al. ............. 700/97 |
| 6,304,794 | B1 |   | 10/2001 | Nishimine et al. |
| 6,546,362 | B1 |   | 4/2003  | Guo et al. |
| 6,701,200 | B1 | * | 3/2004  | Lukis et al. .................. 700/98 |
| 6,772,026 | B1 | * | 8/2004  | Bradbury et al. ............. 700/98 |

* cited by examiner

Primary Examiner—Leo Picard
Assistant Examiner—Charles Kasenge
(74) Attorney, Agent, or Firm—Wei Te Chung

(57) ABSTRACT

A mold design and production management system includes a server (2), client computers (4), design computers (5), machining computers (6), testing computers (7), and customer service computers (10). The server receives mold design requirement sheets submitted by customers from the client computers, and transmits the sheets to the design computers for mold designers to evaluate. The mold designers draw up design drawings of a mold if a customer accepts evaluation results of a corresponding mold design requirement sheet. The server sends the design drawings to the machining computers for operators to machine various parts of the mold and assemble the parts into the finished mold. The testing computers record mold testing information when the mold is being tested. The mold is delivered to the customer when it is satisfactory. Then, the customer service computers reconcile relevant accounts after payment by the customer is confirmed. A related method is also disclosed.

20 Claims, 3 Drawing Sheets

SYSTEM AND METHOD FOR MANAGEMENT OF MOLD DESIGN AND PRODUCTION

BACKGROUND OF THE INVENTION

1. Field of the Invention

The present invention relates generally to computerized mold design and production management systems and methods, and especially to a management system and method for monitoring and controlling operations of different phases of mold design and production.

2. Description of the Related Art

Present-day product design is in most cases carried out by means of CAD (Computer Aided Design). Accordingly, molds for the products are also designed based on CAD data of the products. In a typical case, data of a product shape are first input into a CAD system. Then the product shape or the mold block is depicted on a display. The displayed mold block is a virtual block illustrating an outer shape of the mold, and shows a cavity corresponding to the product shape. When viewing the display, a designer can draw a parting line on the screen to form a parting plane. The CAD system can thus output numeric data to form two mold halves according to the conditions set by the designer.

The art of mold design using a CAD system has been disclosed in a number of patents. For example, U.S. Pat. No. 6,546,362 issued on Apr. 8, 2003 and entitled Mold Design System and Recording Medium provides a system for designing a shape of a mold used to manufacture molded products, the mold shape being based on a given product shape. Another example is in U.S. Pat. No. 6,304,794, issued on Oct. 16, 2001 and entitled Method for Designing a Metal Mold. This patent discloses a method for the design of metal molds for plastic products, which can shorten the time required for the molding process.

The above described systems and methods are directed to managing only the first phase of mold formation, namely mold design. Monitoring of subsequent phases such as mold machining, mold assembly and mold testing is not provided. In most cases, cooperation between various departments of a mold design organization during different phases is required for designing a satisfactory mold. Similarly, the whole process from design through production and testing of a mold should be under the control of corresponding designers. If so, when a problem occurs in any phase of the process, the designers can address the problem timely, and modify originally designed drawings or redesign the drawings according to the customer's requirements. In this way, design costs can be reduced, and design efficiency improved.

SUMMARY OF THE INVENTION

A main objective of the present invention is to provide a management system and method which can monitor and control operations of different phases of mold design and production.

To achieve the above objective, a system for management of mold design and production in accordance with a preferred embodiment of the present invention comprises a server, and a plurality of client computers, design computers, machining computers, testing computers and customer service computers connected to the server through a network. The server comprises: a design requirements receiving module for receiving mold design requirement sheets submitted by customers through the client computers; a design requirements evaluating module for receiving evaluation results of the mold design requirement sheets made by mold designers from the design computers, and for receiving responses to the evaluation results made by the customers from the client computers; a design project creating module for creating a mold design project and a mold design schedule when a response to evaluation results of a mold design requirement sheet indicates that a customer has accepted the evaluation results; and a design drawing receiving module for receiving design drawings of the mold design project completed by the mold designers from the design computers.

The machining computers record mold machining information when various parts of the mold are being machined, and record mold assembling information when the various parts are assembled into the finished mold. The testing computers record mold testing information when the assembled mold is being tested to determine whether it is satisfactory according to the mold design requirement sheet. The customer service computers record mold delivery information when the mold is delivered to the customer, and reconcile relevant accounts after payment by the customer is confirmed.

Further, the present invention provides a preferred mold design and production management method, comprising the steps of: receiving a mold design requirement sheet submitted by a customer from a client computer; receiving evaluation results of the mold design requirement sheet made by mold designers from a design computer; receiving a response to the evaluation results of the mold design requirement sheet made by the customer, the response indicating whether the customer accepts the evaluation results; creating a mold design project and a corresponding mold design schedule when the response by the customer indicates that the customer accepts the evaluation results; receiving design drawings completed by the mold designers according to the mold design requirement sheet from the design computer; machining various parts of the mold according to the design drawings, and assembling the parts into the finished mold; testing the mold to determine whether the mold is satisfactory according to the mold design requirement sheet; and delivering the mold to the customer if the mold is determined as satisfactory.

Other objects, advantages and novel features of the present invention will be drawn from the following detailed description of a preferred embodiment and preferred method of the present invention with the attached drawings, in which:

DETAILED DESCRIPTION OF THE PREFERRED EMBODIMENT

Figure 1:
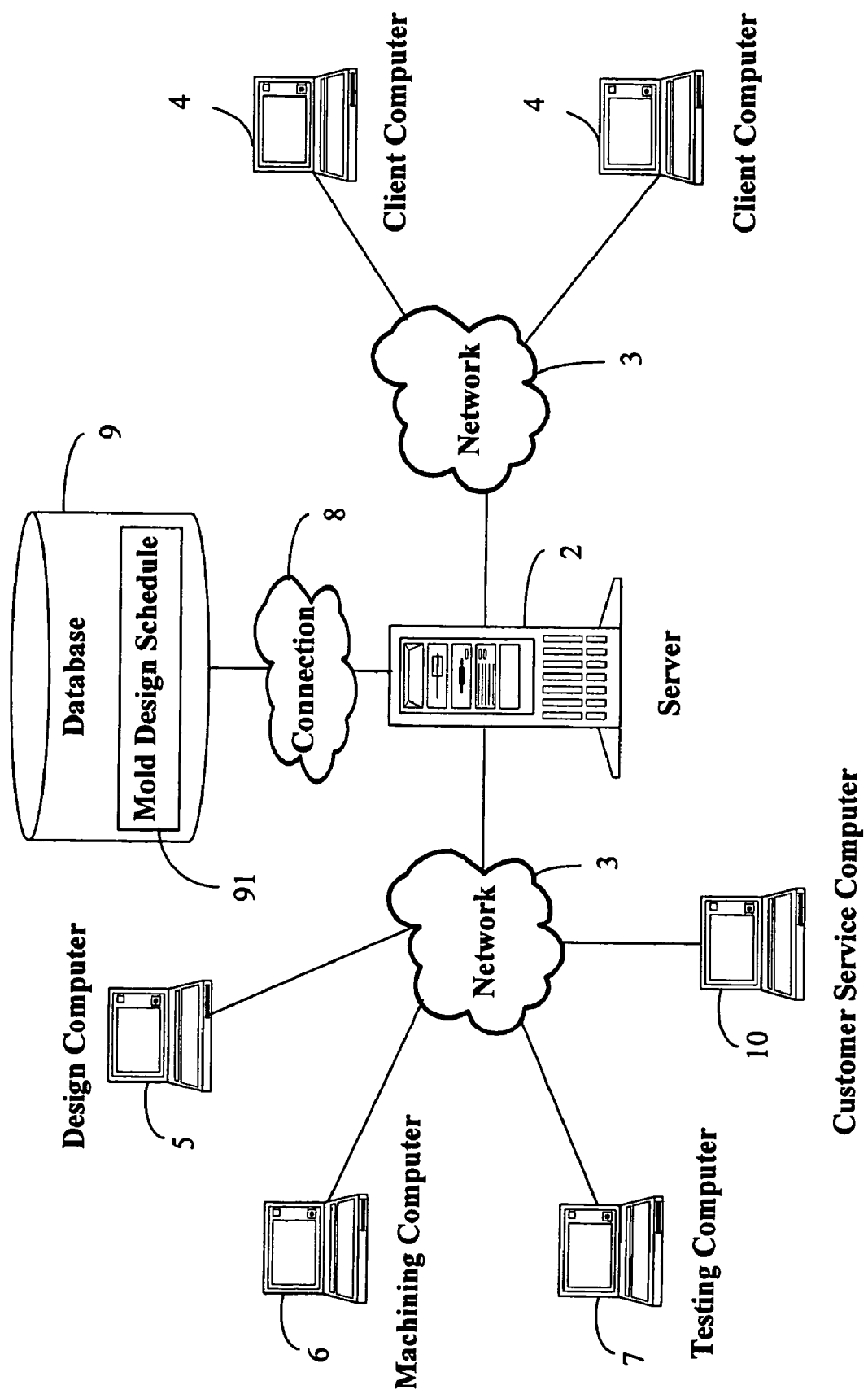
FIG. 1 is a schematic diagram of hardware configuration of a system for management of mold design and production in accordance with the preferred embodiment of the present invention.

FIG. 1 is a schematic diagram of hardware configuration of a system for management of mold design and production in accordance with the preferred embodiment of the present invention. The mold design and production management system comprises a server 2, a database 9 linked to the server 2 via a connection 8, and a plurality of client computers 4 (only two shown), design computers 5 (only one shown), machining computers 6 (only one shown), testing computers 7 (only one shown) and customer service computers 10 (only one shown). The computers 4, 5, 6, 7, 10 are connected to the server 2 through a network 3.

The server 2 contains core and mutable enterprise logic (such as rules, execution, and management) of the mold design and production management system. The server 2 also comprises a plurality of software modules (described in detail below in relation to FIG. 2), for providing functions of monitoring or controlling operations of different design phases. Such functions typically include: receiving mold design requirement sheets transmitted from the client computers 4; receiving evaluation results of the mold design requirement sheets and mold design drawings from the design computers 5; and monitoring operations of mold machining, mold assembly, mold testing and mold delivery to corresponding customers.

The client computers 4 are distributed at various organizations that require mold designs. In the preferred embodiment, these organizations can be collectively referred to as "customers." A customer may be an internal department of an enterprise that employs the mold design and production management system, or an outside company. The customers submit their respective mold design requirement sheets to the server 2 through the network 3. Each mold design requirement sheet contains all information necessary for designing a particular mold, which typically comprises a name of a product to be produced by the mold, a type of the product, and at least one design drawing for the product.

The design computers 5 are situated at a design department of the enterprise, and retrieve the mold design requirement sheets from the server 2. Mold designers evaluate information specified in the mold design requirement sheets, and transmit evaluation results to the server 2 via the network 3. Evaluation results of a particular mold design requirement sheet generally include a name of the product to be produced by the mold, a type of the product, a quantity of sub-molds required, and a price for each sub-mold. If the evaluation results are accepted by the customer, the mold designers draw up design drawings of the mold, and transmit the mold design drawings to the server 2.

The machining computers 6 are situated at a mold machining department of the enterprise. The machining computers 6 receive the mold design drawings from the server 2, record mold machining information when parts of the mold or sub-molds are being machined, and record mold assembling information when the parts or sub-molds are assembled into the mold. The testing computers 7 are located at a mold testing department of the enterprise, and are for recording detailed mold testing information when the mold is being tested. The customer service computers 10 are located at a customer service department of the enterprise, and are for recording mold delivery information and reconciling accounts after payment by the customer is confirmed.

The computers 4, 5, 6, 7, 10 may be general-purpose computer devices such as personal computers, laptops, portable handheld devices (e.g., personal digital assistants), or other suitable devices known in the art. Each of the computers 4, 5, 6, 7, 10 has a plurality of software applications installed therein, for enabling communication with the server 2. The software applications generally include enterprise resource planning software, email software, database management software, and other tools commonly used in a business environment.

The database 9 is used for storing electronic data and records used by the mold design management system, such as mold design requirement sheets, evaluation results of the mold design requirement sheets, and design drawings. In particular, the database 9 contains a plurality of mold design schedules 91 (only one shown). Each mold design schedule 91 relates to a mold design project, and stores relevant information on different design phases. Information on each design phase includes names of relevant personnel, a start time and a completion time of the design phase, and detailed processing information.

Figure 2:
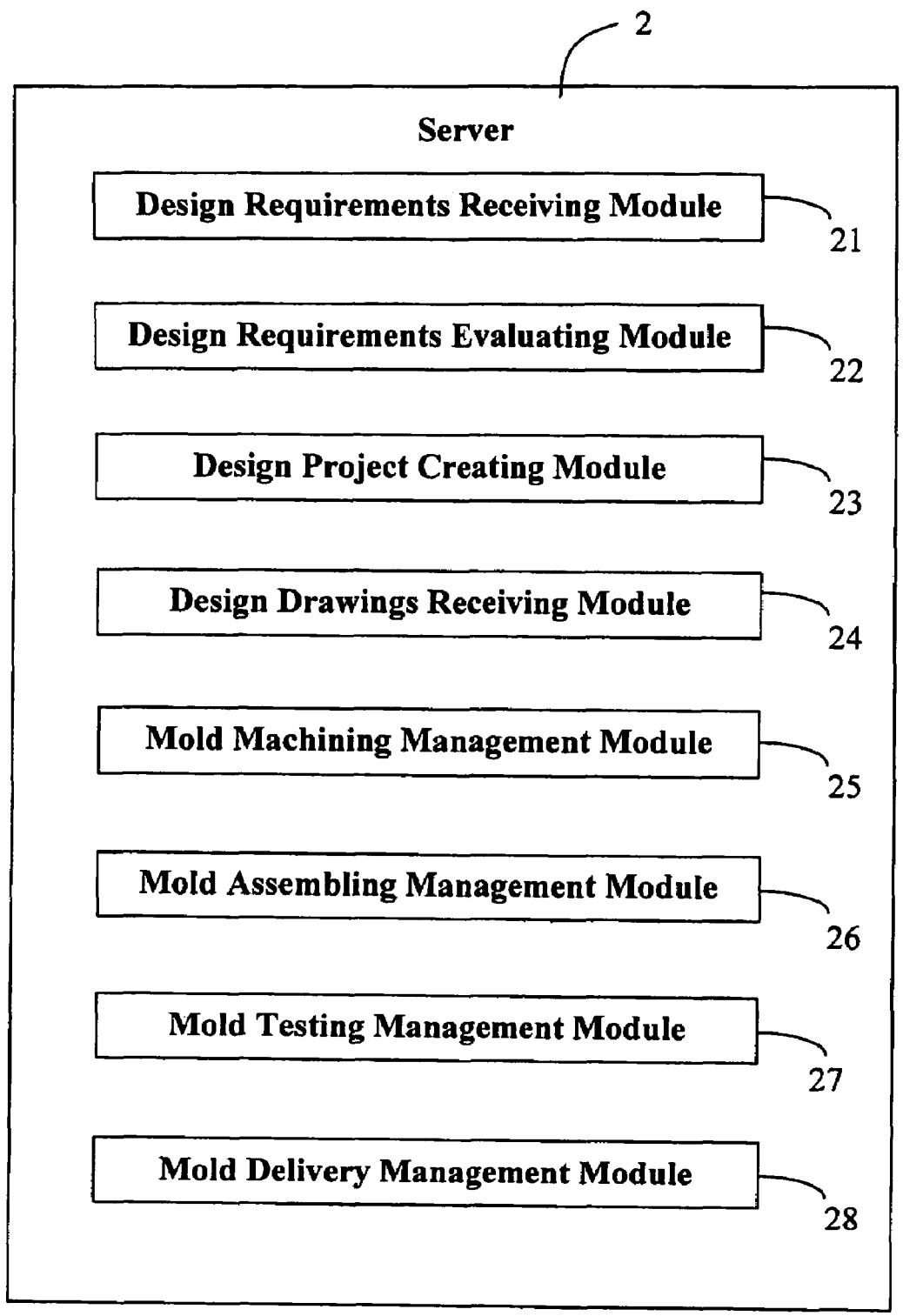
FIG. 2 is a schematic diagram of software function modules of a server of the system of FIG. 1.

FIG. 2 is a schematic diagram of software function modules of the server 2. The server 2 comprises a design requirements receiving module 21, a design requirements evaluating module 22, a design project creating module 23, a design drawings receiving module 24, a mold machining management module 25, a mold assembling management module 26, a mold testing management module 27, and a mold delivery management module 28.

The design requirements receiving module 21 is provided for receiving mold design requirement sheets from the client computers 4. The design requirements evaluating module 22 receives evaluation results of the mold design requirement sheets made by designers from the design computers 5, and responses to the evaluation results made by customers from the client computers 4. The design project creating module 23 creates a mold design project and a corresponding mold design schedule 91 when a response to evaluation results indicates that a customer has accepted the evaluation results. The design drawing receiving module 24 receives design drawings of the mold design project completed by the designers from the design computers 5. The mold machining management module 25 and the mold assembling management module 26 respectively receive mold machining information and mold assembling information from the machining computers 6, and store the mold machining information and mold assembling information in the mold design schedule 91. The mold testing management module 27 receives mold testing information from the testing computers 7, and stores the mold testing information in the mold design schedule 91. The mold delivery management module 28 is provided for receiving mold delivery information from the customer service computers 10.

Figure 3:
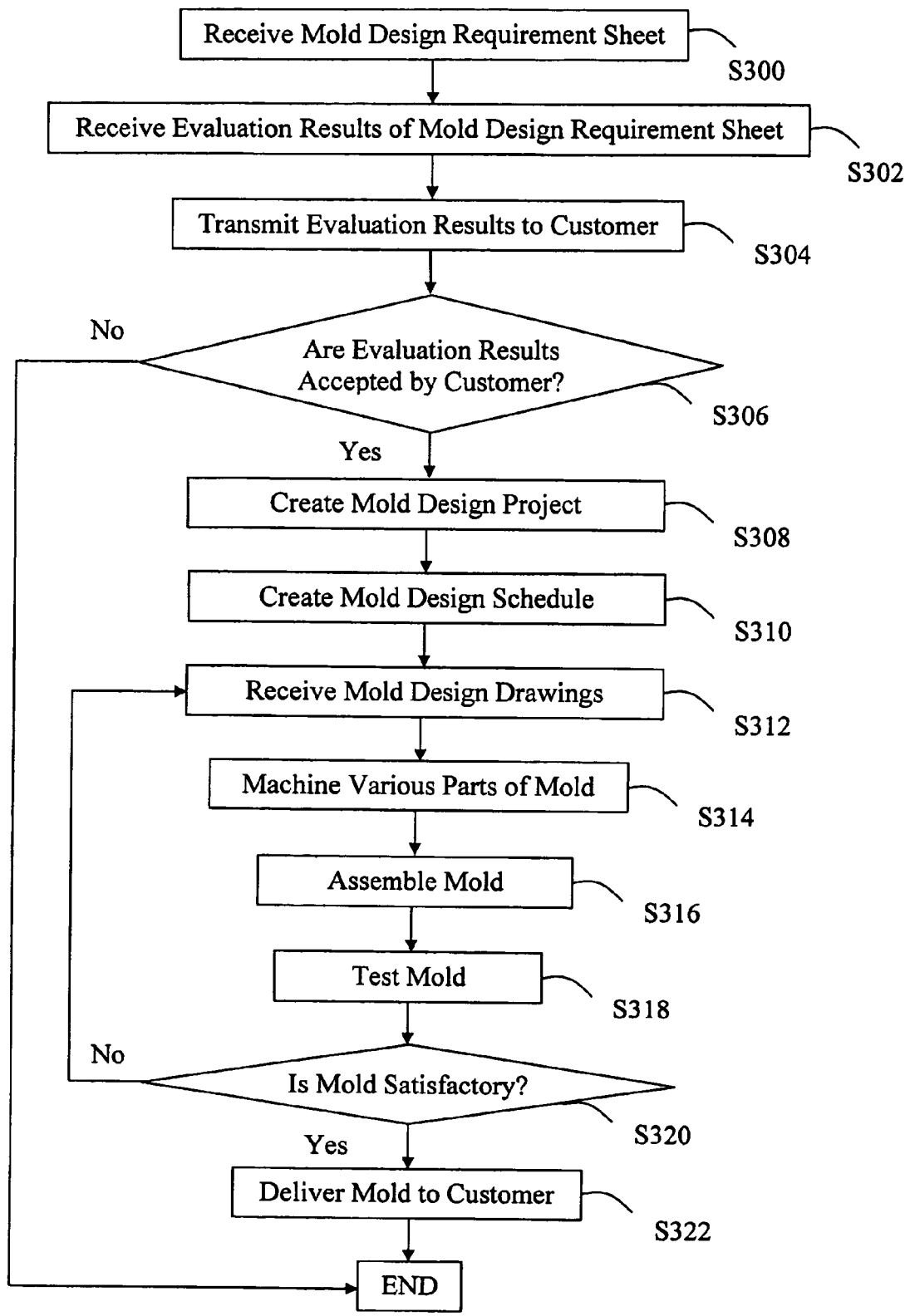
FIG. 3 is a flow chart of a preferred mold design and production management method, utilizing the system of FIG. 1.

FIG. 3 is a flowchart of a preferred method for computer-enabled management of mold design and production in accordance with the present invention. In step S300, a customer submits a mold design requirement sheet to the server 2 through a client computer 4. The design requirements receiving module 21 receives the mold design requirement sheet, and transmits the mold design requirement sheet to a design computer 5 for evaluation by corresponding designers. In step S302, the design requirements evaluating module 22 receives evaluation results of the mold design requirement sheet made by the designers from the design computer 5. In step S304, the server 2 transmits the evaluation results through the network 3 to the client computer 4, for the customer to decide whether to accept the evaluation results.

In step S306, the customer makes a decision about whether to accept the evaluation results, and transmits a response containing the decision to the server 2 through the network 3. If the response indicates that the customer does not accept the evaluation results, the procedure is ended. If the customer accepts the evaluation results, in step S308, the design project creating module 23 creates a mold design project according to the mold design requirement sheet. In step S310, the design project creating module 23 creates a mold design schedule 91, for recording and monitoring of operations of subsequent phases. Then, the server 2 transmits the mold design schedule 91 to the design computer 5.

In step S312, the designers draw up design drawings in accordance with the mold design requirement sheet. The design drawings receiving module 24 receives the design drawings from the design computer 5, and transmits the design drawings to a machining computer 6. In step S314, operators in the mold machining department machine various parts of the mold in accordance with the design drawings. During this phase, the machining computer 6 records detailed mold machining information. In step S316, the operators assemble all the parts into the finished mold, and transfer the mold to the mold testing department. During this phase, the machining computer 6 records detailed mold assembling information, and transmits the mold assembling information along with the previously recorded mold machining information to the server 2.

In step S318, engineers in the mold testing department test the mold, and determine whether the mold is satisfactory according to the mold design requirement sheet. In step S320, the testing computer 7 records detailed mold testing information, and transmits a message to the server 2 containing a determination made by the engineers as to whether the mold is satisfactory. If the mold is not satisfactory, the procedure returns to step S312. Then the designers modify the design drawings, or redesign the mold if necessary. If and when the mold is determined as being satisfactory, in step S322, personnel in the customer service department deliver the mold to the customer. The customer service computer 10 records mold delivery information, and reconciles related accounts after payment by the customer is confirmed.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A management system for monitoring and controlling operations of different phases of mold design and production, the system comprising a server, and one or more of each of client computers, design computers, machining computers, testing computers and customer service computers connected to the server through a network, wherein:
   the server comprises:
   a design requirements receiving module for receiving mold design requirements submitted by customers through said client computers;
   a design requirements evaluating module for receiving evaluation results of mold design requirements made by designers from said design computers, and for receiving responses to the evaluation results made by the customers from said client computers;
   a design project creating module for creating a mold design project and a corresponding mold design schedule when a response to evaluation results of mold design requirements indicates that a customer has accepted the evaluation results; and
   a design drawing receiving module for receiving design drawings of the mold design project completed by the designers from said design computers;
   wherein:
   said client computers are used for submitting mold design requirements to the server through the network;
   said desian computers are used for retrieving the mold design requirements from the server through the network, generating evaluation results of the mold design requirements, and transmitting the evaluation results to the server through the network;
   said machining computers respectively record mold machining information when various parts of the mold are being machined, and record mold assembling information when the various parts are assembled into the mold;
   said testing computers respectively record mold testing information when the mold is being tested to determine whether the mold is satisfactory according to the mold design requirements; and
   said customer service computers respectively record mold delivery information when the mold is delivered to the customer, and reconcile relevant accounts after payment by the customer is confirmed.

2. The system according to claim 1, further comprising a database connected to the server for storing the mold design requirements, the evaluation results of the mold design requirements, the mold design projects and the mold design schedules.

3. The system according to claim 1, wherein the mold design schedule stares information on different design phases including names of relevant personnel, a start time and a completion time of each design phase, and detailed processing information.

4. The system according to claim 1, further comprising a mold machining management module for receiving the mold machining information from said machining computers, and storing the mold machining information in the mold design schedule.

5. The system according to claim 1, wherein the server further comprises a mold assembling management module for receiving the mold assembling information from said machining computers, and storing the mold assembling information in the mold design schedule.

6. The system according to claim 1, wherein the server further comprises a mold testing management module for receiving the mold testing information from said testing computers, and storing the mold testing information in the mold design schedule.

7. The system according to claim 1, wherein the server further comprises a mold delivery management module for receiving the mold delivery information from said customer service computers, and storing the mold delivery information in the mold design schedule.

8. The System according to claim 1, wherein each of the mold design requirements contains information necessary for designing each mold, the information including a name of the product to be produced by the mold, a type of the product, and at least one design drawing for the product.

9. The system according to claim 1, wherein the evaluation results of mold design requirements comprise a name of the product to be produced by the mold, a type of the product, a quantity of parts of the mold required, and a price for each of the parts.

10. A management method for monitoring and controlling operations of different phases of mold design and production, the method comprising the following steps:
   submitting a mold design requirement by a customer at a client computer to a server;
   receiving the mold design requirement from the client computer;

generating evaluation results of the mold design requirement at a design computer, and transmitting the evaluation results to the server;

receiving the evaluation results of the mold design requirement from the design computer;

receiving a response to the evaluation results of the mold design requirement made by the customer, the response indicating whether the customer accepts the evaluation results;

creating a mold design project and a corresponding mold design schedule when the response made by the customer indicates that the customer accepts the evaluation results;

receiving design drawings completed by said mold designers according to the mold design requirement from the design computer;

machining various parts of the mold according to the design drawings, and assembling the parts into the finished mold;

testing the mold to determine whether the mold is satisfactory according to the mold design requirement; and delivering the mold to the customer if the mold is determined as being satisfactory according to the mold design requirement.

11. The method according to claim 10, further comprising the steps of recording mold machining information, and storing the mold machining information in the mold design schedule.

12. The method according to claim 10, further comprising the steps of recording mold assembling information and storing the mold assembling information in the mold design schedule.

13. The method according to claim 10, further comprising the step of recording mold testing information and storing the mold testing information in the mold design schedule.

14. The method according to claim 10, further comprising the steps of recording mold delivery information and storing the mold delivery information in the mold design schedule.

15. The method according to claim 10, further comprising the step of modifying the design drawings or redesigning the mold, if the mold is not satisfactory after being tested according to the mold design requirement.

16. The method according to claim 10, wherein the mold design schedule stores information on different design phases, the information including names of relevant personnel, a start time and a completion time of each design phase, and detailed processing information.

17. The method according to claim 10, wherein the mold design requirement contains information necessary for designing the mold, the information including a name of the product to be produced by the mold, a type of the product, and at least one design drawing for the product.

18. The method according to claim 10, wherein the evaluation results of the mold design requirement comprise a name of the product to be produced by the mold, a type of the product, a quantity of parts of the mold required, and a price for each of the parts.

19. A management method for monitoring and controlling operations of different phases of mold design and production, the method comprising the following steps:

submitting a mold design requirement by a customer at a client computer to a server;

receiving the mold design requirement;

generating evaluation results of the mold design requirement at a design computer, and transmitting the evaluation results to the server;

receiving the evaluation results of the mold design requirement made by one or more mold designers;

receiving a response to the evaluation results of the mold design requirement made by the customer, the response indicating whether the customer accepts the evaluation results;

creating a mold design project and a corresponding mold design schedule when the response made by the customer indicates that the customer accepts the evaluation results;

receiving design drawings completed by said mold designers according to the mold design requirement;

machining various parts of the mold according to the design drawings, and assembling the parts into the finished mold;

testing the mold to determine whether the mold is satisfactory according to the mold design requirement; and delivering the mold to the customer if the mold is determined as being satisfactory according to the mold design requirement.

20. The method according to claim 19, further comprising the steps of recording mold machining information, and storing the mold machining information in the mold design schedule.

* * * * *